Oct. 28, 1930.  H. A. DREFFEIN  1,779,964
FURNACE FOR AND PROCESS OF HEATING ARTICLES
Filed Dec. 19, 1927   2 Sheets-Sheet 1
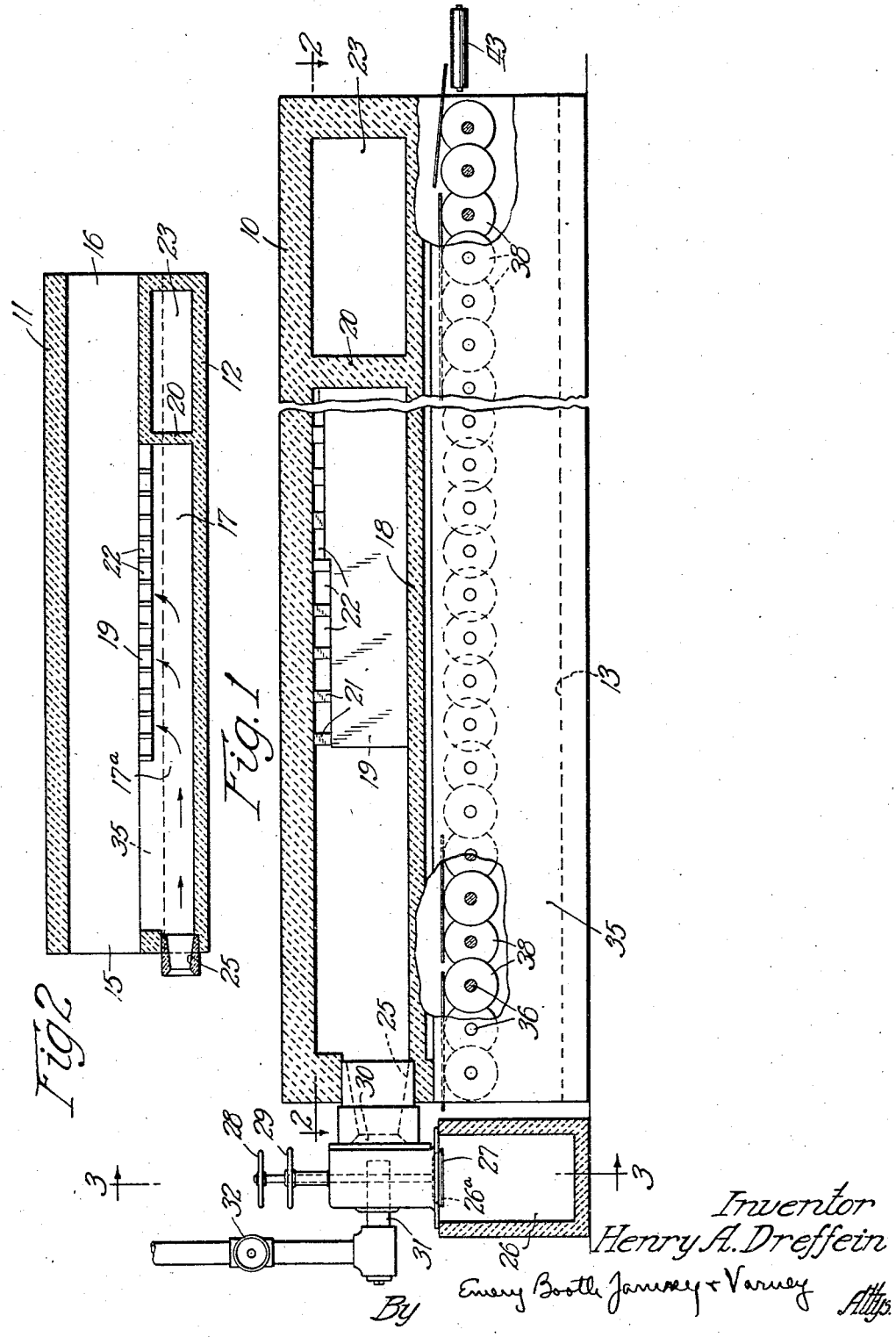
Inventor
Henry A. Dreffein
By Emery Booth Janney & Varney  Attys.

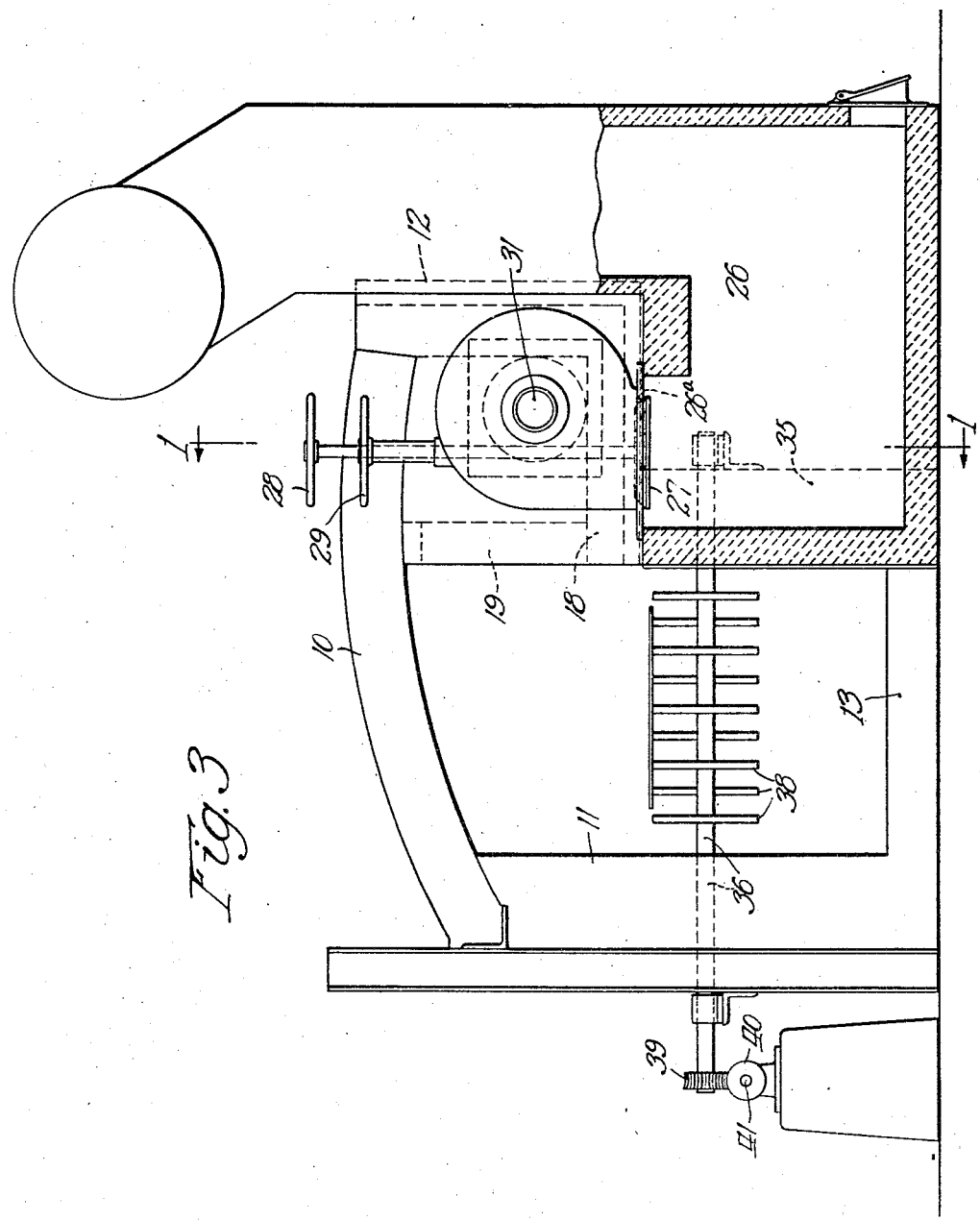

Patented Oct. 28, 1930

1,779,964

UNITED STATES PATENT OFFICE

HENRY A. DREFFEIN, OF CHICAGO, ILLINOIS, ASSIGNOR TO FLINN & DREFFEIN COMPANY, OF CHICAGO, ILLINOIS, A CORPORATION OF ILLINOIS

FURNACE FOR AND PROCESS OF HEATING ARTICLES

Application filed December 19, 1927. Serial No. 240,989.

This invention relates to furnace for and process of heating articles, and is particularly adapted to the heating of metal packs or the like included in the process of tin plate manufacture, although the apparatus and process are adapted to the heating of other materials or articles, as will be obvious.

Among the objects of the invention are to provide process and apparatus whereby efficient heat application and distribution are obtained; whereby the introduction of the heating flame may be effected at relatively high temperature with a quick reduction to a desirable temperature, which may be maintained and distributed throughout a substantial portion of the furnace, with a saving and elimination, in large part, of radiation losses through the furnace walls; to obtain a transverse spread and circulation of the heating gases with substantial velocity; to obtain a heat circulation and application at the discharge end of the furnace which will produce a species of soaking zone at such end; to introduce gases into the furnace during combustion without direct contact of such gases at that time with the metal packs or the like being heated; to direct the heating gases after substantial combustion thereof into a relatively confined chamber or the like, and from such chamber into the furnace proper; to effect combustion of the gases without direct contact thereof while burning with the articles being heated and in such wise as to effect conversion of the suspended tar, dirt and other extraneous substances into ash and depositing the same out of contact with the articles being heated; to permit radiation from the flame in the relatively unconfined space; and in general, to provide apparatus for the carrying out of the objects outlined above.

The above and other objects will be more fully set forth and described in the following specification and shown in the accompanying drawings in which—

Fig. 1 is a vertical, longitudinal section of a furnace embodying my invention, said section being taken along the line 1—1 of Fig. 3;

Fig. 2 is a horizontal section through the furnace, the same being drawn to a diminished scale, the rollers, gas supplying means and the like being omitted for clearness;

Fig. 3 is an end elevation looking toward the charging end of the furnace, the same being drawn to an enlarged scale, a portion of the gas supply duct being broken away for clearness.

Like numerals refer to like elements throughout the drawings in which 10 indicates the roof of a furnace, 11 and 12 the side walls thereof, and 13 the bottom thereof. The roof, walls and bottom are constructed of suitable material, preferably with refractory lining to withstand the heat. 15 indicates the open charging end and 16 the open discharging end of the furnace. In one side of the furnace, in the embodiment illustrated, is a gas chamber, as I term it, formed by the side wall 12, the elevated bottom 18, the inner wall 19 and the end wall 20, extending from the bottom 18 to the roof 10 of the furnace.

The side wall 19 terminates short of the roof 10 of the furnace, the distance of such termination differing and decreasing from the front end of the gas chamber to the rear end, as illustrated in Fig. 1. Refractory blocks 21 or the like are mounted upon the wall 19 in spaced relation to provide discharge ports 22, which necessarily will be of different height, as illustrated in Fig. 1. These blocks may be varied in number or in size or both to vary the size of the ports or ducts 22 to thereby vary the velocity of the gases escaping therethrough. This permits control of such velocity and thereby control of the circulation of the gases, which is more fully described below. The front end of the gas chamber 17 is open, as illustrated at 17ª, and the rear end is closed by the end wall 20, as described above. The end wall 20 is located short of the discharge end of the furnace, the intervening space being occupied by a closed cell 23, also as illustrated in Figs. 1 and 2.

At one side of the charging opening 15 is provided the burner nozzle 25 in alignment with the gas chamber 17. A gas supply duct 26 is provided with a suitable outlet port 26ª, escape of the gas through which is controlled by the valve 27. This valve is controlled by rotation of the hand wheel 28, being held in adjusted position by the locking wheel 29 in well known manner. Port 26ª communicates with a mixing chamber 30 into which is projected the air pipe 31, flow of air through which is controlled by the valve 32. The air is supplied under pressure and mingles with the gas in the chamber 30, forcing the same at desired velocity through the nozzle 25.

Extending through the side wall 11 and the auxiliary intermediate wall 35, which underlies wall 19, is a plurality of shafts 36, suitably journaled exteriorly of said walls, each of such shafts carrying a plurality of disk-like rollers 38, preferably constructed of heat resisting material such as alloy steel. Each of said shafts is provided with worm gear 39 meshing with and actuated by a worm 40, all of said worms 40 being mounted on a drive shaft 41, which is rotated by any suitable means. Variations of the ratios between the worms and gears may be availed of to vary the speeds of rotation of any of the shafts, particularly at the discharge end, if so desired. The disks or rollers 38 on one shaft are preferably staggered with respect to those on the adjacent shafts to provide adequate support for the packs or articles which are being conveyed through the furnace. Adjacent the discharge end 16 of the furnace may be provided a plurality of conveyor rolls 43 or other means to receive and assist in the disposition of the heated packs or other articles.

In the practice of my process by the apparatus described above, a suitable mixture of air and gas having been obtained and the mixture ignited, flame will be blown into the furnace at one side thereof, as will be clear from an inspection of Figs. 1, 2 and 3, and the first portion of the travel of such flame will be in a relatively unconfined space, due to the termination of wall 19 short of the charging end of the furnace. Combustion of the gases is substantially completed during such travel, and solids such as tar, dirt or the like introduced with the air and gas, will be largely converted to ash and deposited to one side of the conveying mechanism. The larger space afforded during the flame propagation and completion of combustion accommodates the considerable expansion of the gases and permits unimpeded radiation from the flame to the relatively cold articles charged in the furnace on the conveying means, which radiation from the flame and absorption by the articles reduces the temperature of the gases to a point more desirable for subsequent heating, thus permitting the introduction of a relatively high temperature flame without a great loss by radiation through the walls of the furnace, and since the introduction is such that the flame does not directly contact with the articles charged in the furnace on the conveying means, the articles escape, to a large extent at least, the deposit of soot or other foreign matter, and oxidization, which would result were the gases impinged on or contacted with such articles during combustion, is obviated. Also, the quick reduction of the heat of the flame effects a considerable economy in the refractories which would would otherwise be subjected as in present day apparatus, to the intense, destructive heat of the flame over a substantial portion of the furnace or heating chamber, and also permits the use of metal rolls, if properly constructed, which is a considerable advantage in the operation of such furnace.

The velocity of the gases carries them, following the travel through the relatively unconfined space, into the more restricted gas chamber 17, which they enter at a reduced temperature, as indicated above. The velocity of the gases entering the chamber 17 sets up an increased pressure therein over that obtaining in the furnace. The ports defined by the blocks 21 compel the gases under pressure in the chamber 17 to flow from the gas chamber 17 transversely into the furnace proper at the upper portion thereof, which causes such gases to travel around the periphery of the furnace, beneath and around the articles carried on the rolls 38, insuring a desirable transverse circulation of such gases relative to the direction of movement of the articles. The velocity and therefore the transverse circulation of such gases may be controlled by varying the size of the ports 22, as will be obvious. By decreasing the height and size of the ports 22 in the direction of the gas travel, proper distribution of the gases is effected to produce and maintain the desired temperature of the heated articles.

Since the velocity with which the gases escape through the ports or ducts 22 affects, in a measure at least, the circulation and distribution of the gases, I find it desirable to be able to vary the size of such ports or ducts to control such distribution, and this variation is readily effected by the use of more or less blocks 21 or of blocks of different size.

The gap or interruption in the chamber 17 at the front of the furnace as stated above permits subjection of the articles being heated, as they enter the furnace in a relatively cool condition, to the direct radiant heat from the burning gases or flame, which effects a quick heating of the relatively cool articles, and puts them in more favorable condition for subsequent heating by the circulated gases, which bring them to their final desired temperature, and at the same time reducing the temperature of the gases of combustion to a point consistent with a relatively long life of the refractories.

Termination of the gas chamber 17 short of the charging end and the necessary flow of the gases from the furnace out of the discharge end 16 subjects the heated articles to such discharging gases, which are at least as high as the temperature of the articles for the distance from the wall 20 to the discharge end 16, which portion of the furnace constitutes a species of soaking zone in which the heat of the articles is maintained, and is permitted to thoroughly penetrate such articles. It is also my belief that the gases of combustion entering the chamber 17 with some velocity create an induction effect which draws the gases from the oven chamber into the chamber 17 through opening 17ª, thereby setting up a species of longitudinal circulation which further assists in the distribution of the heating gases through the oven. This induction effect may be varied or eliminated by varying the size of ports 22.

It will be noted that the burner opening through which the gases are introduced is of considerably less cross sectional area than that of the furnace, and with the introduction of a proper amount of heating gases a thorough circulation and application of the heat thereof to the articles during their travel through the furnace is insured.

My process and apparatus produce a more uniform and desirable heating of the articles, and at the same time increase the life of the refractories used in the furnace by the use of gases at lower maximum temperature.

I am also enabled to use a single burner or what might be termed a focalized burner arrangement which introduces the fuel mixture at one point in contrast to present day apparatus where the introduction of fuel must be made at a number of points, and permits accurate control of the fuel introduction, particularly where raw gas is used, which control is not obtainable where the fuel introduction occurs through a plurality of distributed fuel burners.

It will be apparent that with the structure described above and the practice of the process of heat application likewise described above, the objects outlined in the introduction may be realized.

It will be apparent that the structure disclosed and described is capable of modification and variation, and I do not wish to be restricted to the form shown and described except as defined in the appended claims and within the range of equivalents applicable to such claims.

What I claim is:

1. A process of heat application to articles consisting in projecting an ignited fuel mixture into a furnace at substantial velocity across a gap out of substantial contact with the articles to be heated during combustion but in such relation to some of such articles that the latter are heated mainly only by the direct radiant heat of the burning mixture, whereby the temperature of the mixture is lowered, and thereafter circulating the gases at such lowered temperature among other of such articles.

2. A process of heat application to articles consisting in projecting at substantial velocity flame and gases into a furnace across a gap in a portion thereof, where said articles are fed into the furnace in relatively cool condition, such projection being such as to prevent substantial contact of the flame with said articles passing the gap but so as to permit direct subjection of such articles to the radiant heat from said flame, thereafter continuing the projection of the gases of combustion into a relatively restricted chamber, said gases being thereafter flowed from said chamber into the furnace proper.

3. A process of heat application to articles consisting in projecting flame at substantial velocity into a furnace across a gap in a portion thereof where said articles are fed in relatively cool condition, said flame projection being out of alignment with said articles, thereafter continuing the projection of the gases of combustion into a relatively restricted chamber and discharging said gases from said chamber into said furnace.

4. A process of heat application to articles consisting in projecting flame at substantial velocity into a furnace across a gap in a portion thereof where said articles are fed in relatively cool condition, said flame projection being out of alignment with said articles, thereafter continuing the projection of the gases of combustion into a relatively restricted chamber and discharging said gases from said chamber into said furnace, and recirculating at least a portion of the gases of combustion after outflow from said restricted chamber back into admixture with the gases flowing into said restricted chamber.

5. A furnace, means to supply heating gases to the interior thereof, said furnace being provided with an enlarged portion having a gap at one side adjacent the entrance end of said heating gases and being further provided with a restricted chamber leading from said enlarged portion and arranged to receive said gases after a period of travel thereof in said furnace, and means to conduct said gases from said chamber into said furnace.

6. A furnace, means to supply heating gases to the interior thereof, a wall in said furnace forming a restricted chamber, said wall being terminated short of the entrance end of said heating gases to form a gap, said wall being provided with an outlet passage for the flow of heating gases from said chamber into said furnace, and means to convey articles to be heated past said gap, whereby they will be subjected to the direct radiant heat of the heating gases flowing thereby.

7. A furnace, means to supply heating gases to the interior thereof, a wall in said furnace forming a restricted chamber, said wall being terminated short of the entrance end of said heating gases to form a gap, said wall being provided with an outlet passage for the flow of heating gases from said chamber into said furnace, means to convey articles to be heated past said gap, whereby they will be subjected to the direct radiant heat of the heating gases flowing thereby and means associated with said outlet passage to determine the effective discharge area thereof.

8. A furnace, means to supply heating gases to the interior thereof, a wall in said furnace forming a restricted chamber, said wall being terminated short of the entrance end of said heating gases to form a gap, said wall being provided with an outlet passage for the flow of heating gases from said chamber into said furnace, and means to convey articles to be heated past said gap, whereby they will be subjected to the direct radiant heat of the heating gases flowing thereby said passage being constructed and arranged to direct said gases flowing from said restricted chamber at an angle to the direction of travel of said articles through said furnace.

9. A furnace, means to supply heating gases to the interior thereof, a wall in said furnace forming a restricted chamber, said wall being terminated short of the entrance end of said heating gases to form a gap, said wall being provided with an outlet passage for the flow of heating gases from said chamber into said furnace, and means to convey articles to be heated past said gap, whereby they will be subjected to the direct radiant heat of the heating gases flowing thereby, said passage being located adjacent the top of said furnace.

10. A furnace, means to supply heating gases to the interior thereof, a wall in said furnace forming a restricted chamber, said wall being terminated short of the entrance end of said heating gases to form a gap, said wall being provided with an outlet passage for the flow of heating gases from said chamber into said furnace, and means to convey articles to be heated past said gap, whereby they will be subjected to the direct radiant heat of the heating gases flowing thereby, said restricted chamber being terminated at one end short of the discharge end of the said furnace.

11. A furnace comprising top, bottom and side walls, means to supply fuel mixture at substantial velocity into said furnace at one side thereof, a partition in said furnace terminating a substantial distance short of said fuel supply means to provide a gap, said partition forming a restricted chamber, means to conduct gases from said chamber, said fuel mixture supply means being directed toward said restricted chamber and means to convey articles to be heated past said gap in such wise that they will be subjected only to the direct radiant heat of said fuel mixture while burning during such movement past the said gap.

In testimony whereof, I have signed my name to this specification.

HENRY A. DREFFEIN.